(12) United States Patent
Sellers et al.

(10) Patent No.: US 12,435,753 B2
(45) Date of Patent: Oct. 7, 2025

(54) SOCKET JOINT AND PRESSURE CUP FOR A SOCKET JOINT

(71) Applicant: FEDERAL-MOGUL MOTORPARTS LLC, Southfield, MI (US)

(72) Inventors: Roger G. Sellers, Arnold, MO (US); Dustin Schrieber, Waterloo, IL (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 537 days.

(21) Appl. No.: 17/899,551

(22) Filed: Aug. 30, 2022

(65) Prior Publication Data

US 2024/0068508 A1 Feb. 29, 2024

(51) Int. Cl.
F16C 11/06 (2006.01)

(52) U.S. Cl.
CPC ...... F16C 11/0623 (2013.01); F16C 11/0609 (2013.01); F16C 11/0642 (2013.01); Y10T 403/32704 (2015.01); Y10T 403/32737 (2015.01)

(58) Field of Classification Search
CPC .............. F16C 11/0609; F16C 11/0619; F16C 11/0623; F16C 11/0628; F16C 11/0633; F16C 11/0638; F16C 11/0642; F16C 11/0657; F16C 11/068; Y10T 403/32681; Y10T 403/32696; Y10T 403/32704; Y10T 403/32737; Y10T 403/7058
See application file for complete search history.

(56) References Cited

U.S. PATENT DOCUMENTS

| | | | | |
|---|---|---|---|---|
| 1,646,288 A | * | 10/1927 | Graham | F16C 11/0619 403/DIG. 8 |
| 2,733,085 A | * | 1/1956 | Latzen | F16C 11/0628 403/135 |
| 2,809,855 A | * | 10/1957 | Booth | F16C 11/06 403/138 |
| 2,823,055 A | * | 2/1958 | Booth | F16C 11/0676 280/124.141 |
| 2,846,252 A | * | 8/1958 | Herbenar | F16C 11/0609 403/130 |
| 2,900,196 A | * | 8/1959 | Nienke | B60G 7/005 403/77 |
| 3,969,030 A | * | 7/1976 | Sullivan | F16C 11/0604 403/132 |

(Continued)

FOREIGN PATENT DOCUMENTS

| | | | | |
|---|---|---|---|---|
| DE | | 1905067 U | 11/1964 | |
| DE | | 102011081935 A1 | * 3/2013 | .............. B60G 7/005 |

(Continued)

*Primary Examiner* — Amber R Anderson
*Assistant Examiner* — Kevin J Baynes
(74) *Attorney, Agent, or Firm* — Reising Ethington P.C.

(57) ABSTRACT

A pressure cup for a socket joint and a socket joint having the pressure cup. The pressure cup includes a cup end wall and a side wall extending from the cup end wall to a cup lip edge. The side wall has an outer surface configured to contact an inner bore of a housing and an inner surface configured to at least partially house a stud and a bearing. The inner surface of the side wall includes a curved bearing surface that is configured to contact a spherical bearing by including a curvature that is oriented substantially axially.

19 Claims, 4 Drawing Sheets

(56) References Cited

U.S. PATENT DOCUMENTS

| | | | | |
|---|---|---|---|---|
| 4,154,544 A * | 5/1979 | Gair | ................ | B60G 7/005 403/59 |
| 4,162,859 A * | 7/1979 | McAfee | ............ | F16C 11/0619 403/77 |
| 4,613,251 A * | 9/1986 | Bellamy | ............ | F16C 11/0619 403/114 |
| 4,986,689 A * | 1/1991 | Drutchas | ............ | F16C 11/106 403/135 |
| 4,993,863 A * | 2/1991 | Inoue | ................ | F16C 11/0657 403/71 |
| 5,040,817 A * | 8/1991 | Dunn | ................ | B60D 1/065 280/504 |
| 5,647,799 A | 7/1997 | Gall et al. | | |
| 5,769,720 A | 6/1998 | Aiken et al. | | |
| 6,010,272 A * | 1/2000 | Littman | ............ | F16C 11/0604 403/138 |
| 6,164,829 A * | 12/2000 | Wenzel | ............ | F16C 11/0638 403/135 |
| 6,164,861 A | 12/2000 | Maughan | | |
| 6,398,446 B1 * | 6/2002 | Pazdirek | ............ | B60G 7/001 403/135 |
| 6,413,003 B1 * | 7/2002 | Schmidt | ............ | F16C 11/086 403/135 |
| 6,454,484 B1 * | 9/2002 | Parker | ............ | F16C 11/0628 403/132 |
| 6,902,344 B2 * | 6/2005 | Raak | ................ | F16C 11/0638 403/135 |
| 7,144,182 B1 | 12/2006 | Jordan et al. | | |
| 7,600,940 B1 * | 10/2009 | Byrnes | ............ | F16C 11/0623 403/131 |
| 8,342,769 B2 | 1/2013 | Elterman | | |
| 8,794,860 B1 * | 8/2014 | McGean | ............ | F16C 11/0642 403/137 |
| 8,864,155 B2 * | 10/2014 | Kuroda | ............ | F16C 11/0685 29/527.1 |
| 9,476,447 B2 * | 10/2016 | Schmidt | ............ | B60G 7/005 |
| 9,765,811 B2 * | 9/2017 | Karpman | ............ | F16C 11/0609 |
| 9,845,823 B1 * | 12/2017 | Yaworsky | ............ | F16C 11/0604 |
| 10,557,496 B2 | 2/2020 | Lonergan, III et al. | | |
| 10,605,309 B2 * | 3/2020 | Winter | ............ | F16C 23/046 |
| 2008/0213036 A1 | 9/2008 | Rechtien et al. | | |
| 2015/0273966 A1 * | 10/2015 | Nilsson | ............ | F16C 11/0628 403/132 |
| 2016/0363162 A1 * | 12/2016 | Richeson | ............ | F16C 11/0685 |
| 2022/0186772 A1 * | 6/2022 | Lettmann | ............ | F16C 11/0609 |

FOREIGN PATENT DOCUMENTS

| | | |
|---|---|---|
| EP | 0082638 A1 | 6/1983 |
| EP | 0342351 A1 | 11/1989 |
| JP | 2015080986 A | 4/2015 |

* cited by examiner

SOCKET JOINT AND PRESSURE CUP FOR A SOCKET JOINT

TECHNICAL FIELD

This invention generally relates to vehicle components and, in particular, to socket joints used in steering and suspension systems.

BACKGROUND

With some solid axle vehicle implementations, proper adjustment of camber and/or caster can be a challenge. To provide this adjustment, a socket joint in which the central axis of the housing is offset from the central axis of the stud can be used. However, this arrangement can impose size restrictions. Accordingly, there may be less room to accommodate joint components such as internal bearings and pressure cups.

SUMMARY

According to one embodiment, there is provided a pressure cup for a socket joint comprising a cup end wall and a side wall extending from the cup end wall to a cup lip edge. The side wall has an outer surface configured to contact an inner bore of a housing and an inner surface configured to at least partially house a stud and a bearing. A curved bearing surface is located adjacent the cup lip edge, and the curved bearing surface is configured to contact the bearing by including a curvature that is oriented substantially axially on the inner surface of the side wall.

In some embodiments, the curvature is a radius that mimics a spherical outer profile of the bearing.

In some embodiments, the side wall includes a plurality of axially extending slots.

In some embodiments, there is a junction between the cup end wall and the side wall, and a rounded edge is located on the inner surface at the junction and an angled edge is located on the outer surface at the junction.

In some embodiments, the curved bearing surface is adjacent to a transition surface, and the transition surface leads to an inwardly projecting surface.

In some embodiments, the transition surface is coaxial with a main portion of the inner surface.

In some embodiments, the inwardly projecting surface creates a radially expanded main portion of the inner surface.

In accordance with another embodiment, there is provided a socket joint comprising a stud, a bearing at least partially surrounding the stud, a housing at least partially surrounding the bearing, and a pressure cup. The pressure cup includes a cup end wall and a side wall extending from the cup end wall to a cup lip edge. The side wall has an outer surface that faces the inner bore of the housing and an inner surface that at least partially houses the stud and the bearing. A curved bearing surface is located adjacent the cup lip edge, and the curved bearing surface has a curvature that is oriented substantially axially on the inner surface of the side wall.

In some embodiments, the cup lip edge extends substantially radially and fits in a gap between the bearing and the inner bore of the housing.

In some embodiments, the pressure cup transmits an axial load from a cover plate to a top surface of the bearing.

In some embodiments, the cup end wall is a planar surface that rests against the cover plate.

In some embodiments, the bearing has a spherical outer profile and the curvature has a radius that mimics the spherical outer profile of the bearing.

In some embodiments, the side wall of the pressure cup includes a plurality of axially extending slots.

In some embodiments, a top surface of the stud is located below an end profile of one or more axially extending slots of the plurality of axially extending slots.

In some embodiments, there is a junction between the cup end wall and the side wall, and a rounded edge is located on the inner surface at the junction and an angle edge is located on the outer surface at the junction.

In some embodiments, the housing has a central housing axis and the stud has a central stud axis, and wherein the central stud axis and the central housing axis are radially spaced from each other.

In some embodiments, the curved bearing surface of the pressure cup is adjacent to a transition surface, and the transition surface leads to an inwardly projecting surface.

In some embodiments, the transition surface is coaxial with a main portion of the inner surface.

In some embodiments, the inwardly projecting surface creates a radially expanded main portion of the inner surface.

In accordance with another embodiment, there is provided a socket joint comprising a stud, a spherical bearing at least partially surrounding the stud, a housing at least partially surrounding the bearing, and a pressure cup. The pressure cup includes a cup end wall and a side wall extending from the cup end wall to a cup lip edge. The side wall has an outer surface and an inner surface that at least partially houses the stud and the bearing. A curved bearing surface bears against the spherical bearing.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The socket joint and pressure cup described herein can allow for the use of a spherical bearing in a smaller sized housing bore, with a single component that transmits an axial load from the joint cover plate to the spherical bearing. In some embodiments, the socket joint can be used in implementations to provide for improved camber and/or caster adjustment, particularly with solid axle suspension systems. An offset between the central axis of the joint housing and the central axis of the joint stud helps facilitate this improvement, while maintaining sufficient pivoting capabilities for aligning with corresponding vehicle components and maintaining sufficient axial play to further align with the mating components. The socket joint has a pressure cup that can obviate the need for a separate split upper bearing, thereby reducing the number of components to be assembled and streamlining the manufacturing process.

Figure 1:
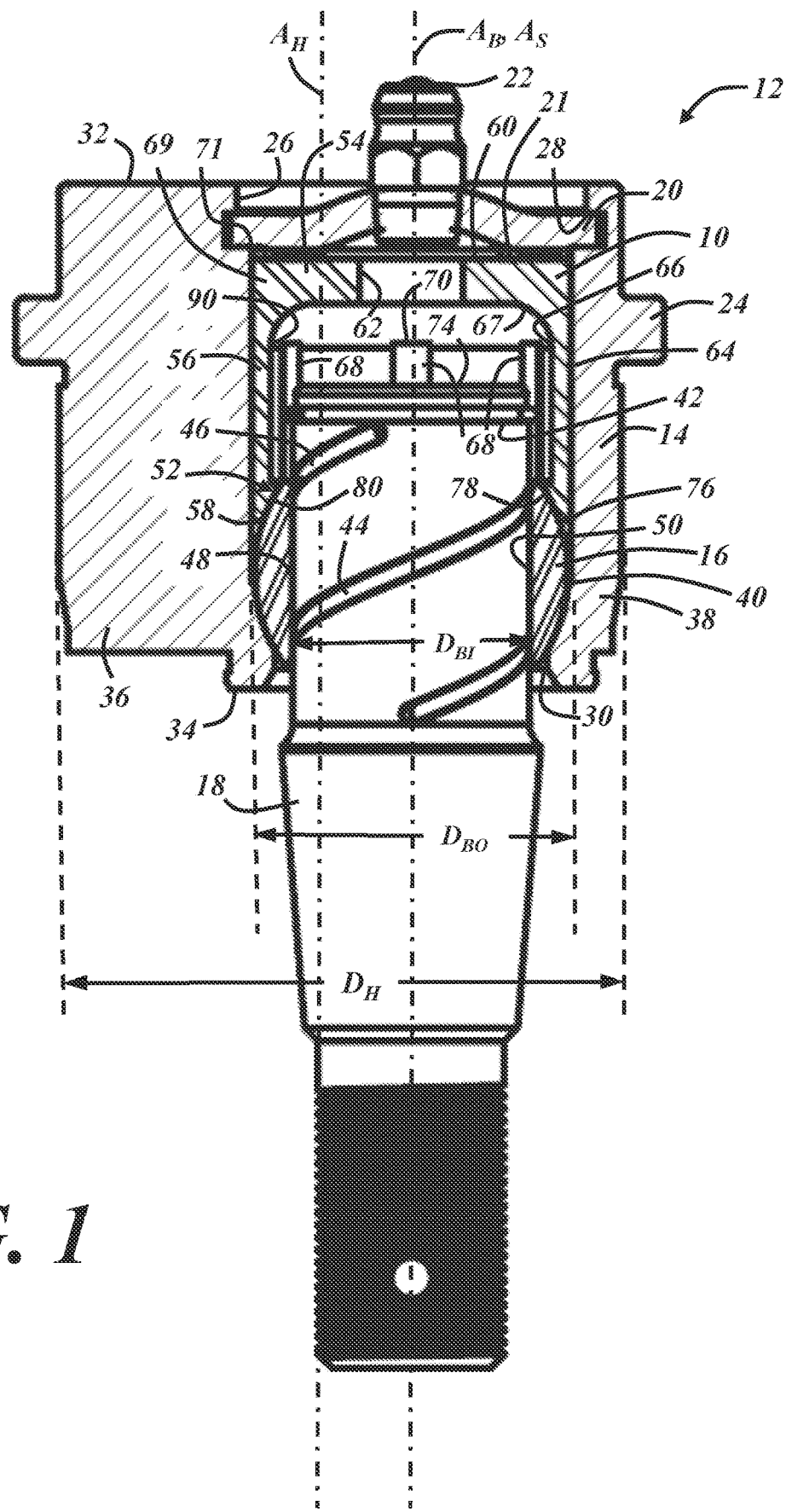
FIG. 1 is a cross-section view of a socket joint having a pressure cup according to one embodiment.

FIG. 1 illustrates one embodiment a pressure cup 10 for a socket joint 12. The socket joint 12 includes a housing 14 at least partially surrounding a bearing 16 and a stud 18. The housing 14, bearing 16, and/or stud 18 can include various threads, grooves, projecting portions, etc., beyond what is particularly illustrated. Moreover, the pressure cup 10 may be used in implementations in which there is not an offset housing 14, but it is particularly advantageous in embodiments in which internal component size may be more limited. Other features may also be included, such as the illustrated cover plate 20, Belleville washer 21, and grease fitting 22. The socket joint 12 may also include other features, such as a dust boot or other operational-based features depending on the desired use and placement of the joint.

As described above, the socket joint 12 advantageously improves performance when used as an upper ball joint in a system having a solid axle. However, it is possible for the pressure cup 10 and the socket joint 12 to be used in other configurations or implementations, particularly those that do not have a solid axle. Further, features relating to the joint 12 may be useful in other joint applications. Accordingly, it is possible to manufacture alternately configured suspension and/or steering components in accordance with the teachings herein. For example, the joint 12 may include any moveable socket configuration, such as those with a ball stud, and is not limited to the explicitly illustrated joint shown in the figures and described herein.

The housing 14 is a generally circular cylindrical component that surrounds the internal components of the joint 12. The housing 14 has a housing outer diameter $D_H$, which is taken at the widest portion of the housing adjacent the stud 18. In the illustrated embodiment, the housing outer diameter $D_H$ is the largest diameter portion of the housing 14, with the exception of the radially expanded seating feature 24. In this embodiment, the housing outer diameter $D_H$ is about 1.901 inches, but this may vary depending on the desired implementation and specifications of the suspension system. The housing 14 also has a central housing axis Ali that extends through the geometric center of a circle defined by the housing outer diameter $D_H$.

The housing 14 has an internal bore 26 in which the bearing 16 and the stud 18 are situated. Most of the bore 26 is radially consistent, with the exception of a radially expanded portion 28 for seating the cover plate 20 and a radially contracted portion 30 for seating the bearing 16. The radially expanded portion 28 of the bore 26 is located closer toward a top surface 32 of the housing 14, and the radially contracted portion 30 of the bore is located closer toward a base surface 34 of the housing. The bore 26 is offset such that the housing 14 includes a first thicker side 36 and a second thinner side 38. Accordingly, a central axis of the bore $A_B$, which extends axially through the center of the bore 26, is radially offset from the central housing axis $A_H$. This arrangement can help provide improved camber and/or caster adjustment. However, in order to manufacture an offset within the confines of the housing outer diameter $D_H$, which is generally dictated by the needs of the suspension system, the internal bore 26 needs to be downsized, and accordingly, the internal components within the bore need to be proportionally downsized as well. As detailed herein, this downsizing, while maintaining requisite performance attributes, can be challenging.

The bearing 16 is situated in the internal bore 26 of the housing 14. The bearing 16 is advantageously a spherical bearing having a spherical outer profile 40. The spherical bearing 16 is smaller than with typical joints, in order to help facilitate the offset configuration. In the illustrated example, the outer diameter of the bearing $D_{BO}$ is about 1.060 inches, which is smaller than more standard joint bearings (e.g., having a bearing diameter of about 1.250 inches or more). Additionally, the difference between the outer diameter of the bearing $D_{BO}$ and the inner diameter of the bearing $D_{BI}$ is smaller than more standard joint bearings. In one example, the spherical bearing 16 is made of a carbon fiber reinforced polyamide material to help decrease friction and increase durability, but other materials are certainly possible. Moreover, the spherical outer profile 40 of the bearing 16 can help promote more uniform wearing, as opposed to tapered bearings or the like. However, to allow for the spherical outer profile 40, the size of the stud 18 must also be reduced and it can be beneficial to minimize the number of internal components situated in the housing bore 26.

The stud 18 in the illustrated embodiment has a central stud axis $A_S$ that extends through the radial center point. Given that the stud 18 is centrally arranged within the internal bore 26 of the housing 14, the stud and the bore are coaxial, as shown in FIG. 1 with a coaligned central stud axis $A_S$ and central bore axis $A_B$. Accordingly, the central stud axis $A_S$, like the central bore axis $A_B$, is radially offset with respect to the central housing axis $A_H$. This arrangement can help improve performance, such as improved camber and/or caster adjustability.

As opposed to a stud that has an integral ball, the stud 18 does not have a ball, which allows for the stud to be inserted into the spherical bearing 16. The bearing 16 can then be retained in place with a retaining ring 42, for example, although other stud configurations are certainly possible. Additionally, the stud 18 may have other features such as one or more helical oil channel grooves 44, 46 located on an outer surface 48 of the stud. Given the size reduction of the stud 18 to accommodate the offset housing arrangement, there is a corresponding reduction in available bearing surfaces. Testing of the small shank stud 18 showed excessive wear between the outer surface 48 of the stud and the inner surface 50 of the bearing 16. The smaller bearing surface between these two components resulted in higher contact bearing pressure for the same amount of load. Review of the tested parts showed that excessive wear is likely the result of insufficient lubrication on the bearing surface in this region. While in some embodiments, the helical oil channel grooves 44, 46 may be used to remedy the problem of insufficient lubrication, alternately configured grooves or no oil channel grooves at all may be feasible options as well.

To help accommodate the spherical bearing 16 around the stud 18, the pressure cup 10 is used, which can be used in place of a split upper bearing and separate smaller pressure cup. This minimizes the parts needed for assembly, thereby streamlining manufacturing efforts. Further, it can be advantageous to minimize the number and size of the internal components in the bore 26 of the housing 14, particularly in the illustrated implementation in which the axis of the housing $A_H$ is offset from the axes of the bore $A_B$ and stud $A_S$. The pressure cup 10 is situated in the bore 26 of the housing 14, at least partially in a gap 52 between the spherical bearing 16 and the internal bore 26.

Figure 2:
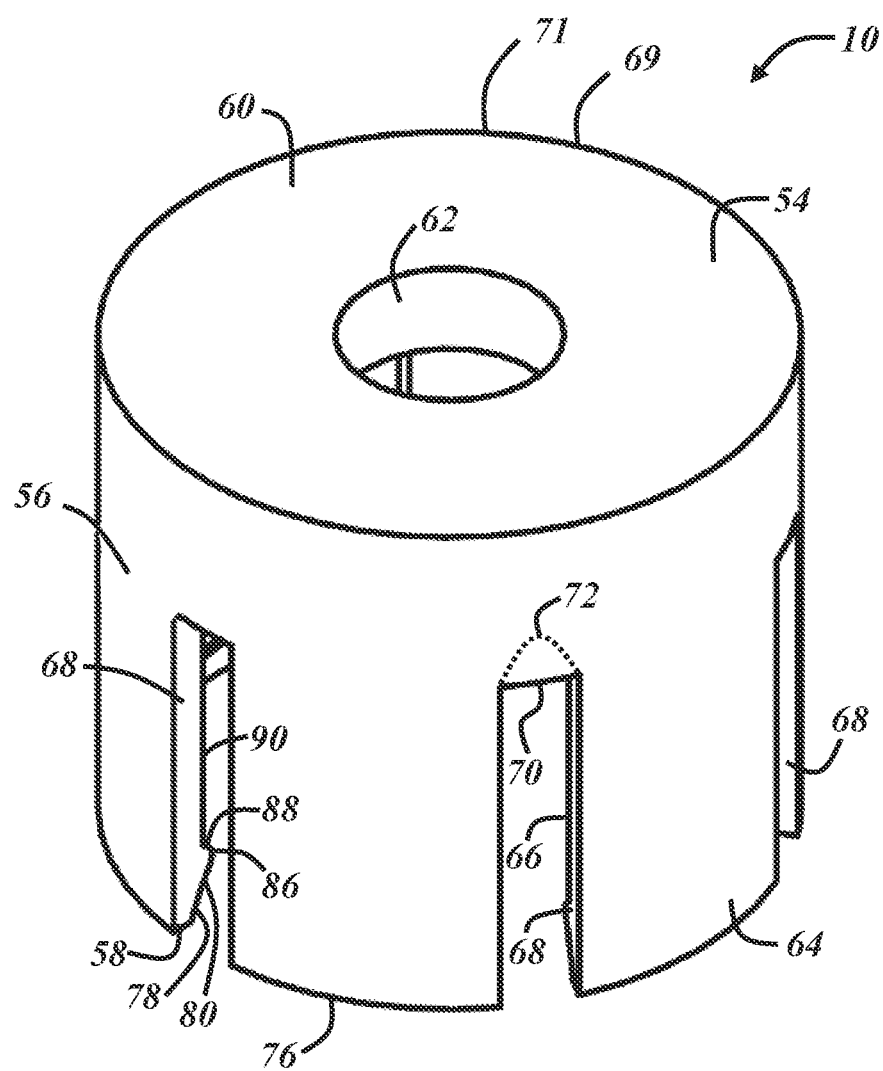
FIG. 2 is a perspective view of the pressure cup of FIG. 1.
Figure 3:
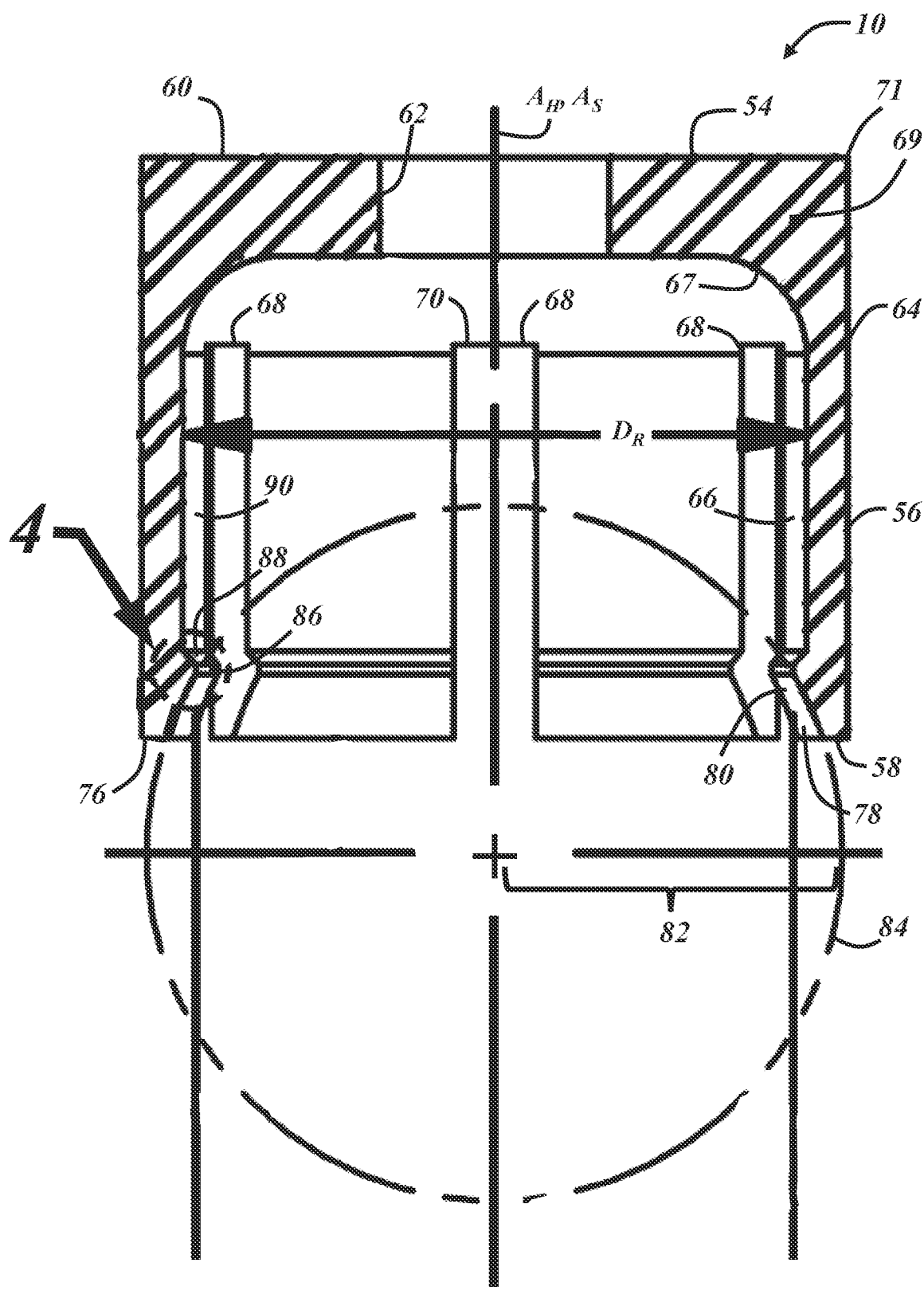
FIG. 3 is a cross-section view of the pressure cup of FIGS. 1 and 2.
Figure 4:
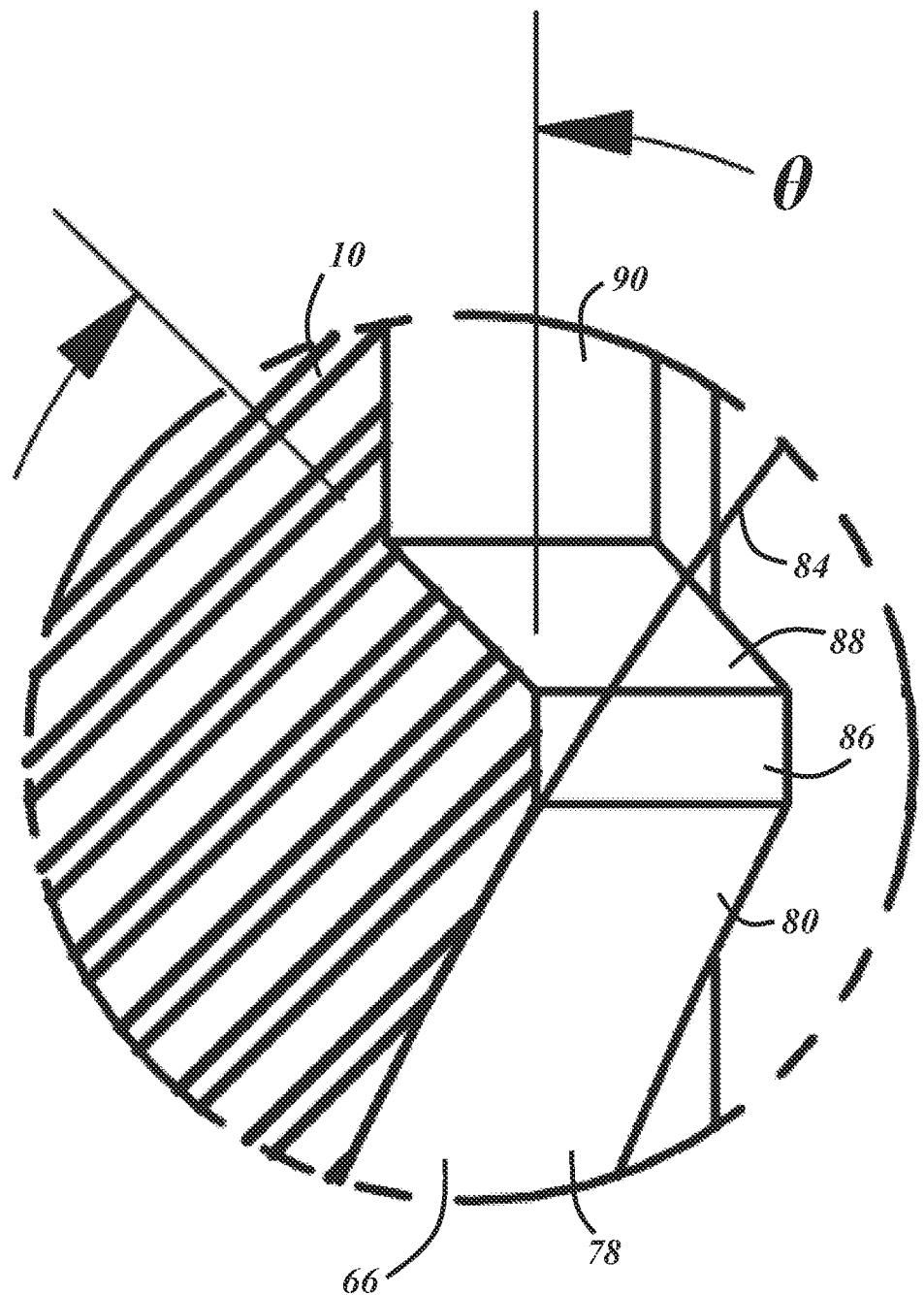
FIG. 4 is an enlarged perspective view of the inner surface of the pressure cup of FIGS. 1-3.

FIGS. 2-4 illustrate the pressure cup 10. The pressure cup 10 includes a cup end wall 54 and a side wall 56 extending from the cup end wall to a cup lip edge 58. The cup end wall 54 is oriented toward the top surface 32 of the housing 14, and includes a planar annular surface 60 that defines an aperture 62 to allow grease flow through the grease fitting 22. The pressure cup 10 serves as a unitary component between the spherical bearing 16 and the Belleville washer 21, and during installation of the cover plate 20, an axial load is transmitted via the pressure cup 10 to the bearing 16 (e.g., about 75 lbs. max load in accordance with an example embodiment). The pressure cup 10 is configured to flex during this load transmission, causing the side wall 56 to properly nest and seat against the bearing 16 and the internal bore 26 of the housing 14. The pressure cup 10 can be made of a metal-based material such as AISI 4140 or JIS SCM 440 steel, to cite a few examples, but other materials for the pressure cup 10 are certainly possible.

The side wall 56 of the pressure cup 10 extends from the cup end wall 54 toward the base surface 34 of the housing 14. The side wall 56 has an outer surface 64 that contacts the internal bore 26 of the housing 14 and an inner surface 66 that at least partially houses the bearing 16 and stud 18. The outer surface 64 is generally cylindrically straight between the cup end wall 54 and the cup lip edge 58 so as to improve the fit of the pressure cup 10 within the internal bore 26 of the housing 14. The inner surface 66 has a number of features, described more fully below, that help the pressure cup 10 better interface with the other internal components of the socket joint 12. Additionally, at the inner surface 66, there is a rounded edge 67 that is located at the cup end wall 54 and side wall 56 junction 69, and at the outer surface 64, there is an angled edge 71 at the junction 69. This configuration maximizes contact with the housing bore 26 while maintaining room for axial play of the stud 18 and being easier to manufacture.

To improve the flexibility of the side wall 56, a plurality of axially extending slots 68 are included that extend from the cup lip edge 58 up toward the cup end wall 54. The axially extending slots 68 only extend partially up the side wall 56, the extent to which can vary depending on the desired flexibility of the side wall 56. In this embodiment, there are six slots 68 that are radially spaced around the side wall 56, but other numbers and sizes for the slots are possible. As shown in FIG. 2, the slots 68 include a squared end profile 70, but it is also feasible to include a U-shaped end profile 72 as represented in dotted lines. At rest, as shown in FIG. 1, a top surface 74 of the stud 18 is located below the end profile 70 of the axially extending slots 68. This configuration allows for additional axial play within the internal bore 26 of the housing 14, which can help improve performance and/or installation of the joint 12.

The cup lip edge 58 is a generally planar surface that is located at the distal end 76 of the side wall 56, opposite from the cup end wall 54. The cup lip edge 58 is a radially extending surface that defines the transition between the outer surface 64 of the side wall 56 and the inner surface 66 of the side wall. The cup lip edge 58 is the narrowest or least wide portion of the side wall 56, which may help to facilitate a better fit of the cup lip edge 58 in the gap 52 between the spherical bearing 16 and the internal bore 26 of the housing 14.

The cup lip edge 58 leads to the curved bearing surface 78 on the inner surface 66 of the side wall 56. The curved bearing surface 78 is shaped to directly bear against and contact the bearing 16, and more particularly, a spherical bearing 16 that can enhance performance of the joint 12. The curved bearing surface 78 is directly adjacent to the cup lip edge 58 and fits into the gap 52 between the bearing 16 and the internal bore 26 of the housing 14. The curved bearing surface 78 serves as the main contact surface for the pressure cup 10 against the spherical bearing 16.

The curved bearing surface 78 includes a curvature 80 that is oriented substantially axially on the inner surface 66 of the side wall 56. Substantially axially, as used herein, means that a majority of the curvature (50% or more) runs between the cup lip edge 58 and up toward the cup end wall 54, as opposed to a radially extending curvature, which is also present given the cylindrical shape of the pressure cup 10. Accordingly, the radial width of the side wall 56 gets larger toward the cup end wall 54 as the curved bearing surface 78 curves in from the cup lip edge 58. In this embodiment, as illustrated in FIG. 2, the curvature 80 is a circular curvature having a radius 82 as shown with respect to the reference circle 84. The radius 82 mimics the outer spherical profile 14 of the bearing 16 so as to provide a better conformal interface between the pressure cup 10 and the spherical bearing 16. Accordingly, in this embodiment, the curved bearing surface 78 is an arc of the reference circle 84, and the reference circle 84 is defined by a shape of the spherical bearing 16. The radius 82 is about 0.55 inches, plus or minus 0.01 inches, but the size may vary depending on the desired use and specifications for the joint 12.

With particular reference to FIG. 4, the curved bearing surface 78 leads to a transition surface 86, which then leads to an inwardly projecting surface 88 and a radially expanded main portion 90 of the inner surface 66 of the side wall 56. The radially expanded main portion 90 has a diameter DR and makes up a majority of the inner surface 66 of the side wall 56. The transition surface 86 is coaxial with the main portion 90 of the inner surface 66, and the inwardly projecting surface 88 is located at an angle θ of about 45° with respect to the main portion. Other angular transitions and shapes are certainly possible. For example, the transition surface 86 may be more of a point or curve rather than an axially extending surface that is coaxial with the main portion 90. However, this arrangement provides for an adequately sized curved bearing surface 78, while creating a radially expanded main portion 90 that can better accommodate the stud 18 and retaining ring 42. This can improve manufacturing efforts since the bearing 16 and stud 18 can be pre-assembled, inserted into the housing bore 26 and then the flexible pressure cup 10 can be installed. The cover plate 20 is then pressed into place, and the axial load is transmitted to the bearing 16 via the pressure cup 10.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A pressure cup for a socket joint, comprising:
a cup end wall; and
a side wall extending from the cup end wall to a cup lip edge, wherein the side wall has an outer surface configured to contact an inner bore of a housing and an inner surface configured to at least partially house a stud and a bearing, wherein a curved bearing surface is located adjacent the cup lip edge, wherein the curved bearing surface is configured to contact the bearing by including a curvature that is oriented substantially axially on the inner surface of the side wall, wherein the curved bearing surface is adjacent to a transition surface, and the transition surface leads to an inwardly projecting surface, and wherein the transition surface is at least partially coaxial with a main portion of the inner surface.

2. The pressure cup of claim 1, wherein the curvature is a radius that is configured to mimic a spherical outer profile of the bearing.

3. The pressure cup of claim 1, wherein the side wall includes a plurality of axially extending slots.

4. The pressure cup of claim 1, comprising a junction between the cup end wall and the side wall, wherein a rounded edge is located on the inner surface at the junction and an angled edge is located on the outer surface at the junction.

5. The pressure cup of claim 1, wherein the inwardly projecting surface creates a radially expanded main portion of the inner surface.

6. The pressure cup of claim 1, wherein the cup lip edge is at least partially curved.

7. A socket joint, comprising:
a stud;
a bearing at least partially surrounding the stud;
a housing at least partially surrounding the bearing, the housing having an inner bore; and
a pressure cup, wherein the pressure cup includes a cup end wall and a side wall extending from the cup end wall to a cup lip edge, wherein the side wall has an outer surface that faces the inner bore of the housing and an inner surface that at least partially houses the stud and the bearing, wherein a curved bearing surface is located adjacent the cup lip edge, wherein the curved bearing surface has a curvature that is oriented substantially axially on the inner surface of the side wall, wherein the curved bearing surface is adjacent to a transition surface, and the transition surface leads to an inwardly projecting surface, and wherein the transition surface is at least partially coaxial with a main portion of the inner surface.

8. The socket joint of claim 7, wherein the cup lip edge extends substantially radially and fits in a gap between the bearing and the inner bore of the housing.

9. The socket joint of claim 7, wherein the pressure cup transmits an axial load from a cover plate to a top surface of the bearing.

10. The socket joint of claim 9, wherein the cup end wall is a planar surface that rests against the cover plate.

11. The socket joint of claim 7, wherein the bearing has a spherical outer profile and the curvature has a radius that mimics the spherical outer profile of the bearing.

12. The socket joint of claim 7, wherein the side wall of the pressure cup includes a plurality of axially extending slots.

13. The socket joint of claim 12, wherein a top surface of the stud is located below an end profile of one or more axially extending slots of the plurality of axially extending slots.

14. The socket joint of claim 7, comprising a junction between the cup end wall and the side wall, wherein a rounded edge is located on the inner surface at the junction and an angled edge is located on the outer surface at the junction.

15. The socket joint of claim 7, wherein the housing has a central housing axis and the stud has a central stud axis, and wherein the central stud axis and the central housing axis are radially spaced from each other.

16. The socket joint of claim 7, wherein the inwardly projecting surface creates a radially expanded main portion of the inner surface.

17. The socket joint of claim 7, wherein the cup lip edge is at least partially curved.

18. A socket joint, comprising:
a stud;
a retaining ring at least partially surrounding the stud;
a spherical bearing at least partially surrounding the stud;
a housing at least partially surrounding the bearing and the retaining ring, the housing having an inner bore; and
a pressure cup, wherein the pressure cup at least partially houses the retaining ring that at least partially surrounds the stud, wherein the pressure cup includes a cup end wall and a side wall extending from the cup end wall to a cup lip edge, wherein the side wall has an outer surface and an inner surface that at least partially houses the stud and the bearing, and wherein a curved bearing surface bears against the spherical bearing.

19. The socket joint of claim 18, wherein the cup lip edge is at least partially curved.

* * * * *